United States Patent Office 2,811,504
Patented Oct. 29, 1957

2,811,504

SYNTHETIC RUBBER-SYNTHETIC RESIN BLEND CONTAINING AN ALKYLENE POLYAMINE

Dean E. Peterson, Naugatuck, and William F. Brucksch, Jr., Bethany, Conn., assignors to United States Rubber Company, New York, N. Y., a corporation of New Jersey No Drawing. Application September 1, 1954, Serial No. 453,702

6 Claims. (Cl. 260—45.5)

The invention relates to a method of preventing the frosting of the resin-rubber combinations composed of styrene-acrylonitrile resin mixed with butadiene-acrylonitrile rubber. Such blends are patented by Daly U. S. Patent No. 2,439,202 and consist of 50–90% of a resinous copolymer of 50 to 85% by weight of styrene and 50 to 15% by weight of acrylonitrile mixed with 50–10% of a rubbery copolymer of butadiene and acrylonitrile.

It has been observed that the surface of the finished resin as it comes from the molding or calendering machine frequently develops a whitish coating on standing. This coating is most noticeable in dark colored stocks; a black stock may change to a light gray in the course of a surface exposure.

We have found that this bloom can be eliminated by the use of alkylene polyamines. These amines are particularly effective against blooming. They do cause a measure of discoloration which can be kept at a minimum by the use of lower amounts of the chemicals.

These amines are effective in amounts by weight of 0.1 to 5.0 parts based on 100 parts of the rubber-resin blend. A preferable ratio is 0.2 to 0.8 part.

The polyamine may be incorporated into any stage of the milling or the mixing process or the finished surface may be coated or dipped into an alcohol solution of the polyamine.

In diffuse light the bloom is most pronounced on the surface exposed directly to light. An exposure of one month is sufficient to demonstrate a pronounced difference between a stock which will bloom and a stock which will not bloom. The effect can also be demonstrated by exposure of panels to an atmosphere of ozone for a 48-hour period.

The chemicals of this invention do not adversely affect the physical properties of the blend such as impact resistance, flexural strength, etc. Typical examples include ethylene diamine, diethylene triamine, triethylene tetramine, tetraethyl pentamine, 1,2-propylene diamine, trimethylene diamine, hexamethylene diamine etc. Furthermore, it is necessary that there be at least two amino groups per molecule since aliphatic monoamines have been shown to be ineffective.

Compounds in which the amino groups are not primary groups do not possess this property. Thus tetramethyl diaminodiphenylmethane is of no value.

In place of the free amines it is possible to use salts of the amines such as the hydrochlorides, the sulfates, the oxalates, the phosphates, the maleates.

Primary aromatic amines such as aniline and p-toluidine were found ineffective.

The following examples are given to illustrate the invention, parts by weight; each chemical was tested in two formulations:

A. A stock containing carbon black in which stock the bloom was readily apparent.
B. A white stock for observation of discoloration.

|  | Black Stock | White Stock |
|---|---|---|
| Rubber [1] | 30 | 30 |
| Resin [2] | 70 | 70 |
| Non-discoloring antioxidant | 0.6 | 0.6 |
| Calcium stearate | 0.7 | 0.7 |
| Titanium dioxide |  | 2.0 |
| Carbon black | 1.0 |  |
| Chemical | 0.6 | 0.6 |

[1] Butadiene (65) acrylonitrile (35) divinyl benzene copolymer (Romeyn et al. U. S. Patent No. 2,600,024).
[2] Styrene 70%, acrylonitrile 30% copolymer.

The chemicals were blended into the rubber on a cold mill and the resin added as a powder on a hot mill at 330° F.

The stocks were aged one month at room temperature.

| Chemical | Bloom Resistance (Black Stock) | Discoloration (White Stock) |
|---|---|---|
| Tetraethylene pentamine | Excellent | None. |
| Triethylene tetramine | Good | Do. |
| Ethylene diamine | do | Do. |
| Hexamethylene diamine | do | Do. |
| None (Control) | Poor | Do. |

Aliphatic monoamines were ineffective:

| Laurylamine | Poor | None. |
| Ethanolamine | do | Do. |
| Triethanolamine | do | Do. |
| Tributylamine | do | Do. |
| Piperidine | do | Do. |
| None (Control) | do | Do. |

Having thus described our invention, what we claim and desire to protect by Letters Patent is:

1. A polyblend of approximately 50 to 10 percent by weight of a butadiene-acrylonitrile rubbery copolymer and approximately 50 to 90 percent by weight of a styrene-acrylonitrile resinous copolymer, containing by weight from about 0.1 part to about 5.0 parts per 100 parts of the polyblend, of an amine selected from the group consisting of alkylene polyamines, and their salts.

2. A composition as set forth in claim 1 in which the amine is an alkylene polyamine.

3. A composition as set forth in claim 1 in which the amine is tetraethylene pentamine.

4. A composition as set forth in claim 1 in which the amine is triethylene tetramine.

5. A composition as set forth in claim 1 in which the amine is ethylene diamine.

6. A composition as set forth in claim 1 in which the amine is hexamethylene diamine.

References Cited in the file of this patent

UNITED STATES PATENTS

| 2,395,507 | Sauser | Feb. 26, 1946 |
| 2,505,349 | Daly | Apr. 25, 1950 |
| 2,692,871 | Pechukas | Oct. 26, 1954 |